US011351899B2

(12) United States Patent
Kobayashi

(10) Patent No.: US 11,351,899 B2
(45) Date of Patent: Jun. 7, 2022

(54) ARMREST AND VEHICLE SEAT

(71) Applicant: Tachi-S Co., Ltd., Tokyo (JP)

(72) Inventor: Koji Kobayashi, Tokyo (JP)

(73) Assignee: TACHI-S CO., LTD., Tokyo (JP)

(*) Notice: Subject to any disclaimer, the term of this patent is extended or adjusted under 35 U.S.C. 154(b) by 0 days.

(21) Appl. No.: 17/331,864

(22) Filed: May 27, 2021

(65) Prior Publication Data
US 2021/0380027 A1   Dec. 9, 2021

(30) Foreign Application Priority Data
Jun. 9, 2020   (JP) ................. JP2020-100404

(51) Int. Cl.
A47C 31/00 (2006.01)
B60N 2/58 (2006.01)
A47C 31/02 (2006.01)
A47C 7/18 (2006.01)
B60N 2/75 (2018.01)

(52) U.S. Cl.
CPC ........... B60N 2/767 (2018.02); B60N 2/5883 (2013.01)

(58) Field of Classification Search
CPC ........ B60N 2/753; B60N 2/757; B60N 2/767; B60N 2/5883; B60N 2/4228; B60N 2/5825; B60N 2/686; B60N 2/79; B60N 3/101; B60N 2/3011; B60N 2/305; B60N 2/3086
See application file for complete search history.

(56) References Cited

U.S. PATENT DOCUMENTS

| 6,386,629 | B1* | 5/2002 | Severinski | B60N 2/3011 297/188.1 |
| 7,735,913 | B2* | 6/2010 | Crombez | B60N 2/79 297/113 |
| 8,157,322 | B2* | 4/2012 | Daisuke | B60N 2/803 297/216.13 |
| 8,602,492 | B2* | 12/2013 | Nakaya | B60N 2/68 297/216.13 |
| 8,708,408 | B2* | 4/2014 | Andersson | B60N 2/79 297/188.17 |
| 8,911,011 | B2* | 12/2014 | Andersson | B60N 2/757 297/188.14 |
| 9,120,406 | B2* | 9/2015 | Sato | B60N 2/4228 |
| 9,216,702 | B1* | 12/2015 | Mannor | B60N 2/5825 |
| 9,616,786 | B2* | 4/2017 | Tanaka | B60N 2/5816 |
| 10,081,277 | B2* | 9/2018 | Moroi | B60N 2/5825 |
| 2009/0160227 | A1* | 6/2009 | Crombez | B60N 2/757 297/113 |
| 2011/0030596 | A1* | 2/2011 | Boinais | B60N 2/58 112/402 |
| 2014/0042785 | A1* | 2/2014 | Sato | B60N 2/5825 297/216.14 |
| 2015/0097406 | A1* | 4/2015 | Tanaka | B60N 2/757 297/378.1 |
| 2015/0343956 | A1* | 12/2015 | Hipshier | B60N 3/101 296/37.8 |

(Continued)

FOREIGN PATENT DOCUMENTS

JP   H09-024170 A   1/1997

Primary Examiner — Shin H Kim
(74) Attorney, Agent, or Firm — Morgan, Lewis & Bockius LLP

(57) ABSTRACT

Provided is an armrest capable of preventing the outer layer of a side surface of an armrest body from being rolled up by the cover of a rotating mechanism or the like.

7 Claims, 7 Drawing Sheets

(56) References Cited

U.S. PATENT DOCUMENTS

| | | | | |
|---|---|---|---|---|
| 2016/0052636 A1* | 2/2016 | Moeller | ................ | B64D 25/02 |
| | | | | 244/121 |
| 2018/0037145 A1* | 2/2018 | Moroi | ................ | B60N 2/5825 |
| 2018/0208084 A1* | 7/2018 | Patel | ................ | B60N 2/42727 |
| 2021/0009018 A1* | 1/2021 | Takeda | ................ | B60N 2/757 |
| 2021/0380027 A1* | 12/2021 | Kobayashi | ............. | B60N 2/767 |

\* cited by examiner

ARMREST AND VEHICLE SEAT

BACKGROUND

Field

The present invention relates to an armrest and a vehicle seat.

Description of Related Art

Some vehicle seats each have an armrest on a side of a seat body. For example, the armrest is attached to the seat body so as to be rotatable about an axis extending in a seat width direction (see Patent Publication JP-A-H09-24170).

SUMMARY

Incidentally, a drawback of such an armrest described above is that when an armrest body rotates, the outer layer of a side surface of the armrest body in the vicinity of a rotating portion of the armrest is brought into contact with and pulled by, for example, the cover of a rotating mechanism disposed adjacent to the armrest body, whereby the outer layer is rolled up. Such rolling up of the outer layer exposes a metal part inside the armrest body and elicits a poor appearance of the armrest. In addition, exposing the metal part inside the armrest body is not preferable from a safety perspective.

The present invention has been contrived in view of the foregoing points, and an object thereof is to provide an armrest and a vehicle seat that can prevent the outer layer of the side surface of the armrest body from being rolled up by the cover of the rotating mechanism or the like.

An armrest of a vehicle seat according to one aspect of the present invention includes an armrest body that has at least an upper surface, a lower surface, and a side surface connected to the upper surface and the lower surface and facing in a seat width direction, and is capable of rotating with respect to a seat body about an axis extending in the seat width direction, wherein the armrest body includes, on the side surface, a connecting portion connected to a rotating mechanism for rotating the armrest body, and an outer layer covering at least a peripheral region of at least either a lower region or an upper region of the connecting portion along an edge of the connecting portion, a section of the outer layer that covers the peripheral region of the connecting portion includes a first outer layer portion and a second outer layer portion connected by stitching to the first outer layer portion, and a stitching line stitching together the first outer layer portion and the second outer layer portion is formed so as to extend to a rear of the armrest body and bend toward the edge of the connecting portion, and an end point of the stitching line reaches the edge of the connecting portion.

According to this aspect, the section of the outer layer that covers the peripheral region of the connecting portion includes the first outer layer portion and the second outer layer portion connected by stitching to the first outer layer portion, and the stitching line stitching together the first outer layer portion and the second outer layer portion is formed to extend to the rear of the armrest body and bend toward the edge of the connecting portion, and an end point of the stitching line reaches the edge of the connecting portion. Accordingly, even when the armrest body is subjected to friction by the cover of the rotating mechanism or the like when the armrest body rotates, the rolling up of the outer layer of the side surface of the armrest body can be prevented.

In the foregoing aspect, the second outer layer portion may be formed so as to cover the upper surface or the lower surface of the armrest body that is adjacent to the peripheral region of the connecting portion, and extend from the upper surface or the lower surface to a side surface where the peripheral region of the connecting portion is located.

In the foregoing aspect, an edge of the outer layer that corresponds to the edge of the connecting portion may be configured such that a part of a stitching portion on a front side of the end point is formed of an edge of the first outer layer portion and a part of the stitching portion on a rear side of the end point is formed of an edge of the second outer layer portion.

In the foregoing aspect, the armrest body may be at least rotatable to assume a first position where the upper surface is horizontal and a second position where the upper surface is upright, and in a side view, the end point of the stitching portion may be disposed adjacent to a virtual vertical line passing through a rotation center of the connecting portion when the armrest body is in the first position.

In the foregoing aspect, the armrest may further include the rotating mechanism and a cover that covers the rotating mechanism, wherein the cover may be disposed adjacent to the outer layer covering the peripheral region of the connecting portion of the armrest body.

In the foregoing aspect, the rotating mechanism may be provided on a side surface of the armrest body that is on an opposite side to the seat body.

In the foregoing aspect, the rotating mechanism may have a lock mechanism that locks rotation of the armrest body at a predetermined position.

A vehicle seat according to another aspect of the present invention includes the armrest and the seat body.

According to the present invention, the outer layer of the side surface of the armrest body can be prevented from being rolled up by the cover of the rotating mechanism or the like.

DETAILED DESCRIPTION

Figure 1:
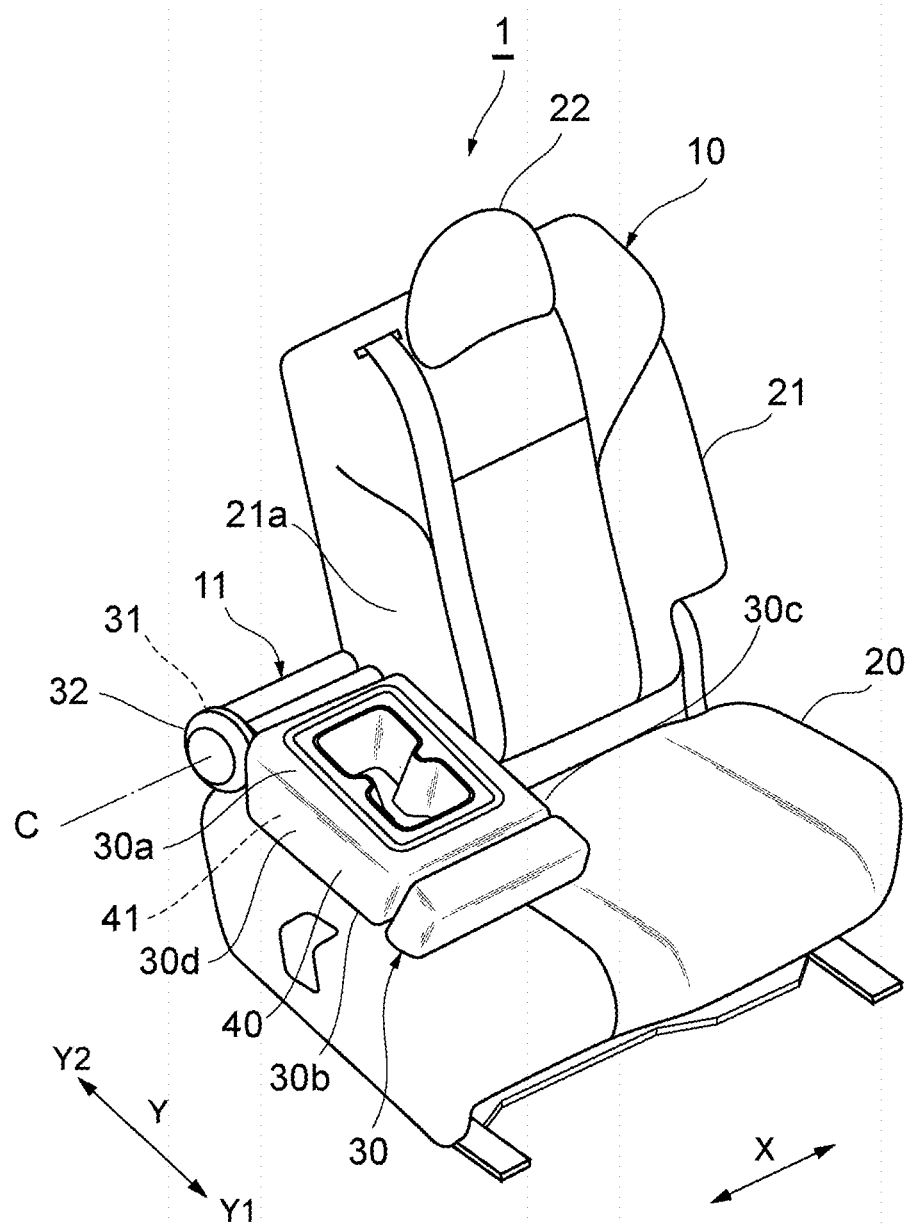
FIG. 1 is a perspective view showing an example of a configuration of a vehicle seat in which an armrest body is in a first position.

A preferred embodiment of the present invention is described hereinafter with reference to the drawings. FIG. 1 is a perspective view showing an example of a configuration of a vehicle seat 1 according to the present embodiment. For example, the vehicle seat 1 includes a seat body 10 and an armrest 11. The vehicle seat 1 of the present embodiment is suitable for seats behind the first row, such as the second and third rows of the vehicle.

The seat body 10 includes, for example, a seat cushion 20 on which an occupant sits, a seatback 21 against which the occupant leans back, a headrest 22 that supports the head of the occupant, and the like.

The armrest 11 is disposed adjacent to a side surface 21*a* on one side (center side of the vehicle) of the seatback 21 in a seat width direction X. The seat cushion 20 extends toward, for example, the armrest 11, and the armrest 11 is disposed above an extension portion of the seat cushion 20.

Figure 2:
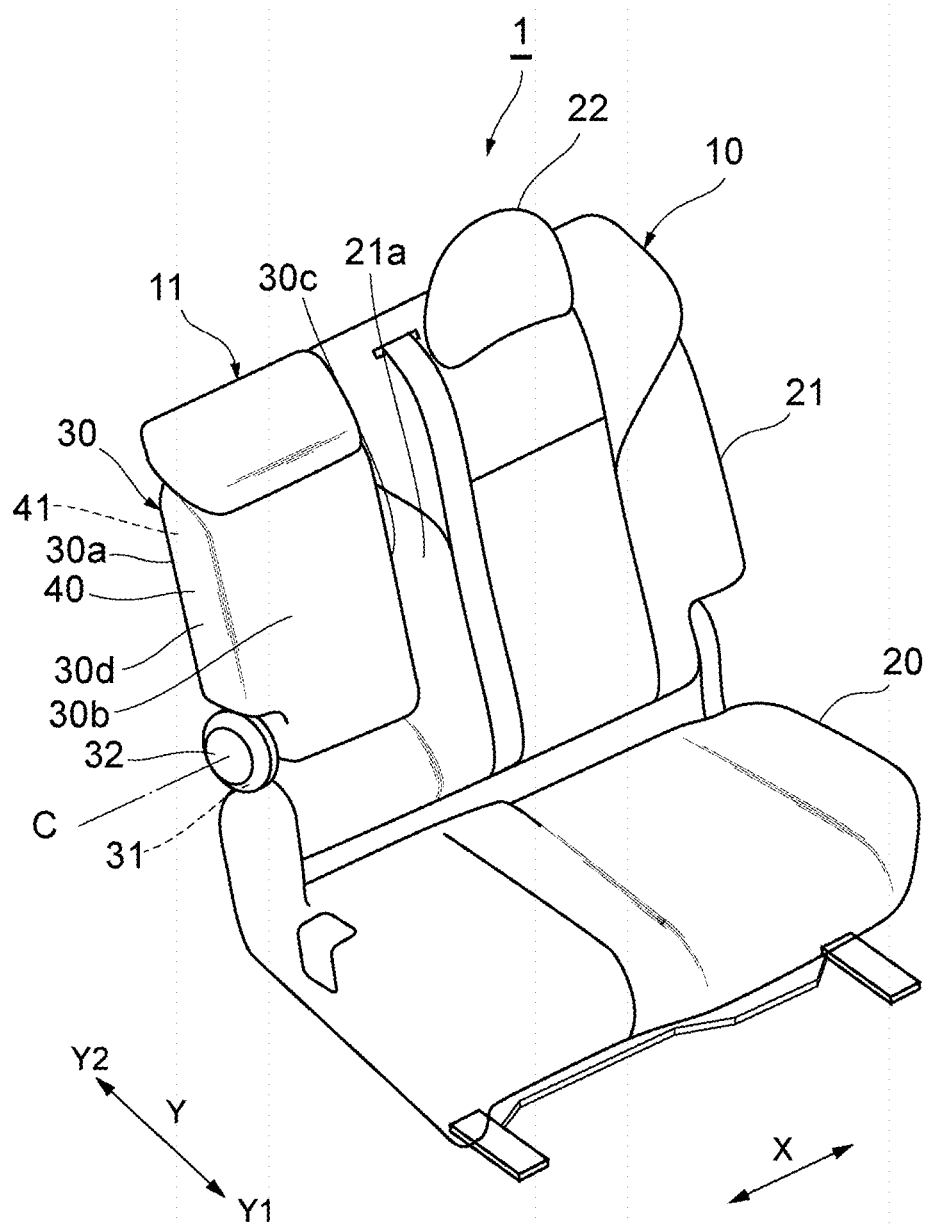
FIG. 2 is a perspective view showing an example of the configuration of the vehicle seat in which the armrest body is in a second position.

The armrest 11 is deformable between a first position in which an upper surface 30*a* is substantially horizontal as shown in FIG. 1 and a second position in which the upper surface 30*a* is substantially vertical as shown in FIG. 2. When in the first position, the armrest 11 can be used as an elbow rest or a storage. When in the second position, the armrest 11 can be used as a backrest. In the present specification, the top, bottom, front, and back of the armrest 11 are based on the state in which the armrest 11 is in the first position (the state shown in FIG. 1).

The armrest 11 includes, for example, an armrest body 30, a rotating mechanism 31 for rotating the armrest body 30, and a cover 32 covering the rotating mechanism 31.

The armrest body 30 is attached so as to be rotatable about a rotation axis C with respect to the seat body 10, the rotation axis C extending in the seat width direction X. Therefore, the armrest body 30, by rotating, can be displaced to the first position in which the upper surface 30*a* of the armrest body 30 is substantially horizontal and the second position in which the upper surface 30*a* of the armrest body 30 is upright.

Figure 3:
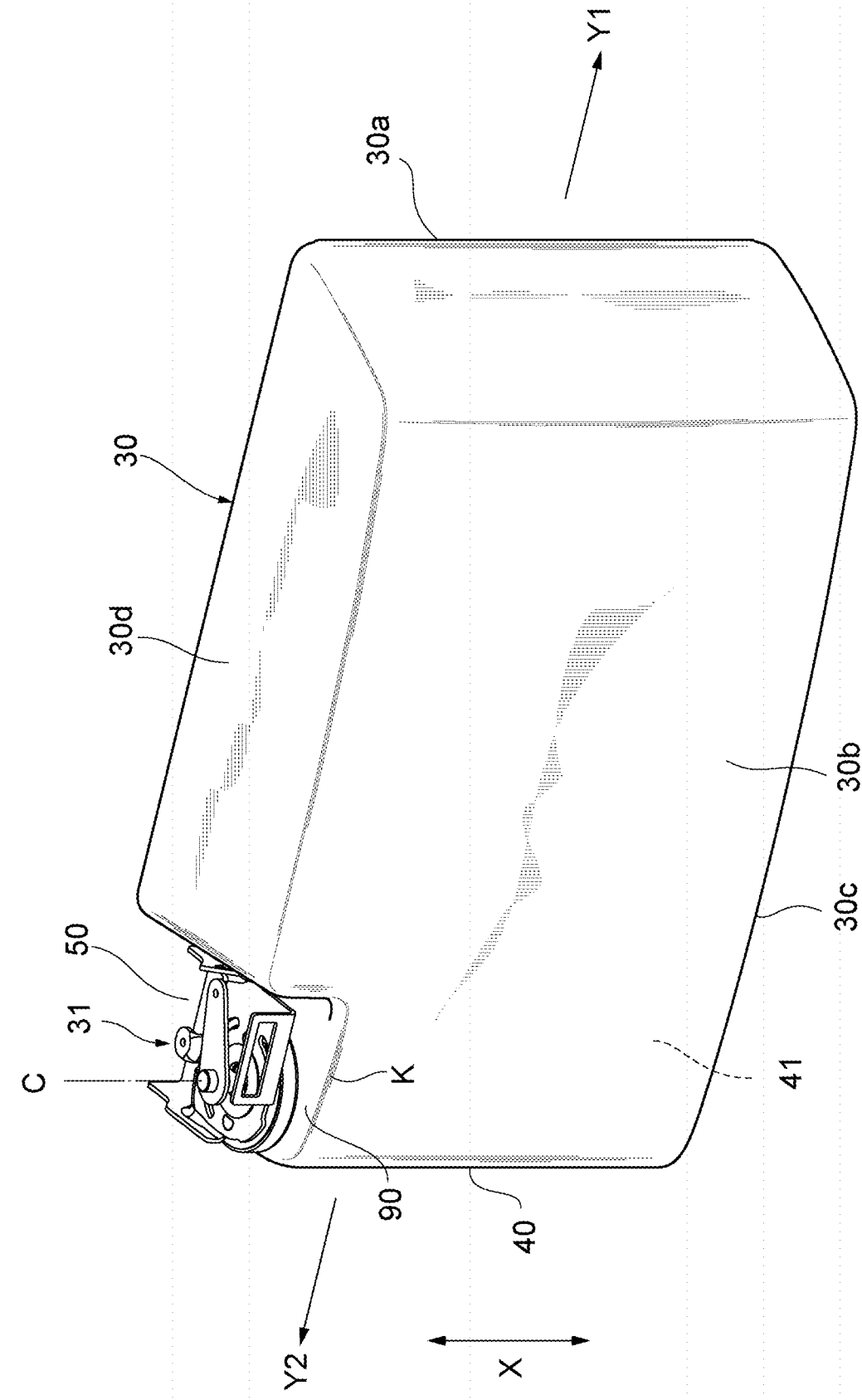
FIG. 3 is a perspective view of the armrest body.

As shown in FIGS. 1 to 3, the armrest body 30 has a thick, substantially rectangular plate shape. The armrest body 30 includes, for example, the upper surface 30*a*, a lower surface 30*b*, and side surfaces 30*c* and 30*d* in the seat width direction X. The side surface 30*c* is located on the seat body 10 side, and the side surface 30*d* is located on the opposite side of the seat body 10. The lower surface 30*b* extends to approximately front and rear surfaces of the armrest body 30. For example, the lower surface 30*b* and the side surfaces 30*c* and 30*d* of the armrest body 30 are covered with an outer layer 40. The outer layer 40 covers a pad 41 provided inside the armrest body 30. The outer layer 40 is made of synthetic resin, leather, or the like.

Figure 4:
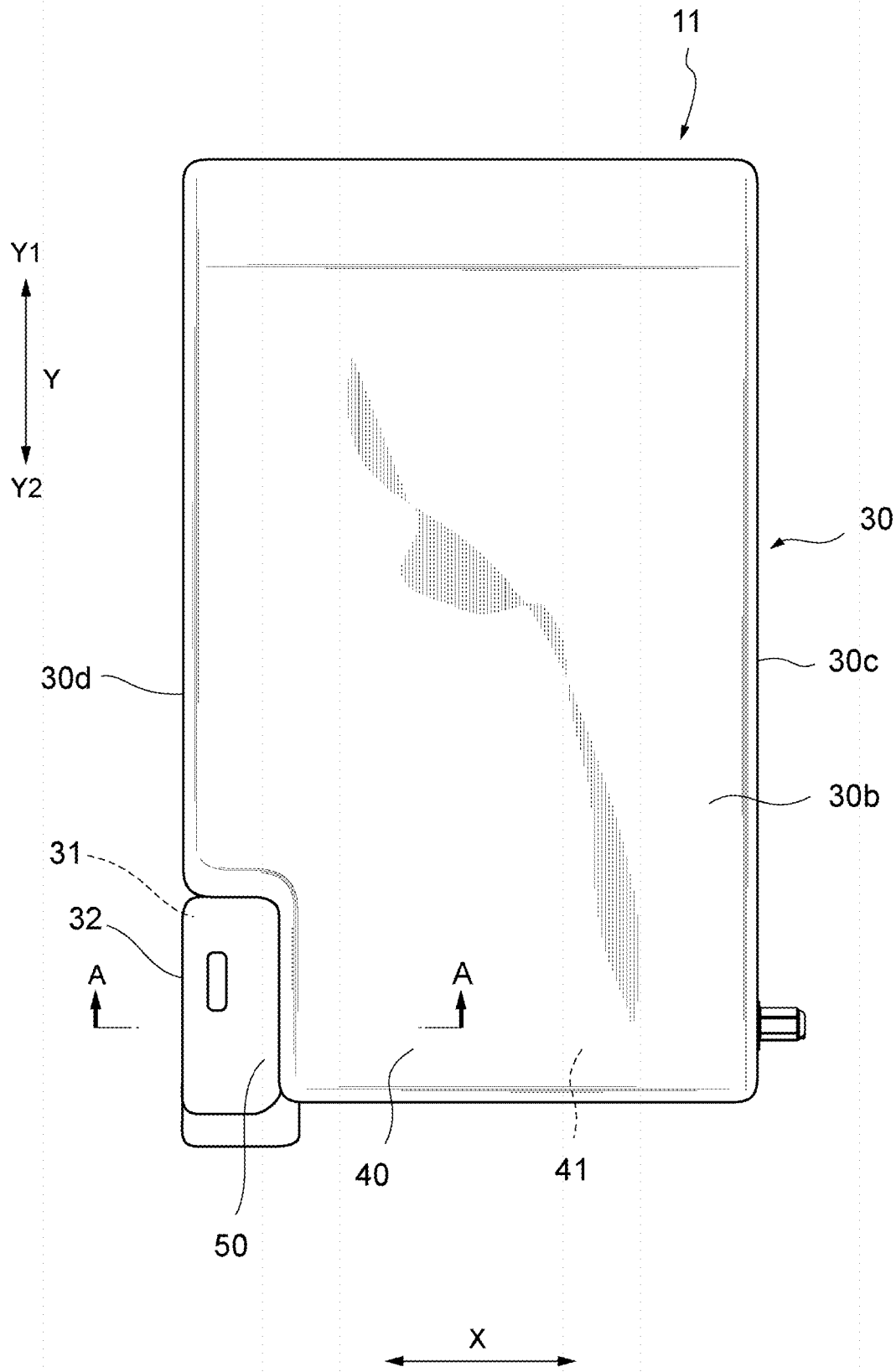
FIG. 4 is a bottom view of an armrest.

As shown in FIG. 3, a recessed portion 50 is formed in a rear portion of the side surface 30*d* of the armrest body 30. The recessed portion 50 has a rectangular shape when viewed from below as shown in FIG. 4, and is formed by cutting out a rear corner portion of the armrest body 30. The rotating mechanism 31 and the cover 32 are arranged in the recessed portion 50.

Figure 5:
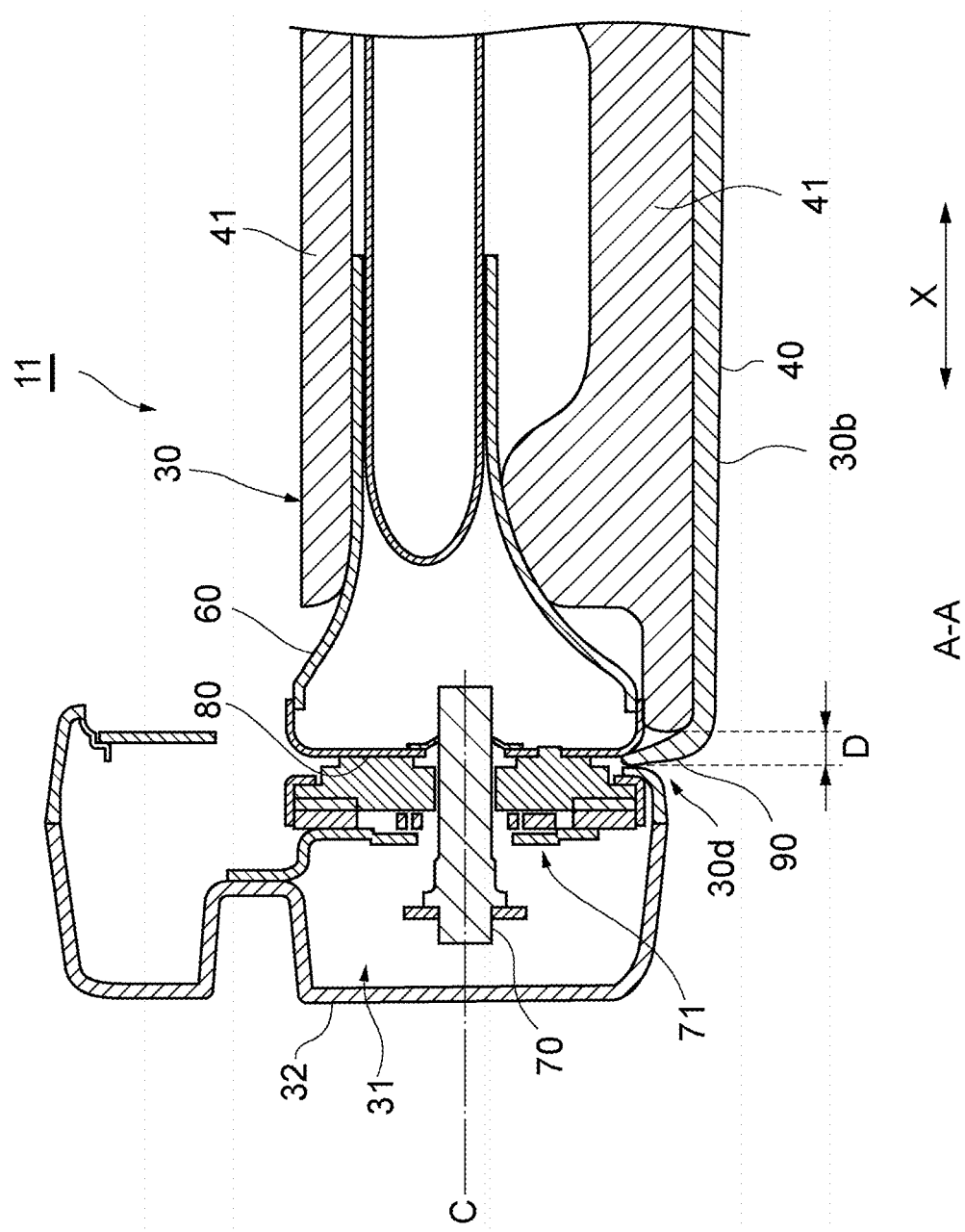
FIG. 5 is a cross-sectional view of the armrest, taken along A-A of FIG. 4.

FIG. 5 is a cross-sectional view of a rear portion of the armrest 11 that is obtained by cutting the rear portion of the armrest 11 on a vertical plane parallel to the seat width direction X (cross-sectional view taken along A-A of FIG. 4). A shaft frame 60 penetrating the armrest body 30 in the seat width direction X is provided inside the armrest body 30. The armrest body 30 rotates about the shaft frame 60.

As shown in FIG. 5, the rotating mechanism 31 includes, for example, a connecting shaft 70 connected to the shaft frame 60 of the armrest body 30, and a lock mechanism 71 that holds the connecting shaft 70 to regulate the rotation of the connecting shaft 70. The lock mechanism 71 can lock and unlock the rotation of the armrest body 30 in the first position and the second position of the armrest body 30.

The cover 32 is made of, for example, resin. The cover 32 is disposed adjacent to the side surface 30*d* of the armrest body 30 and is in contact with the outer layer 40 of the side surface 30*d*. By "the cover 32 is disposed adjacent to the side surface 30*d* of the armrest body 30", it means that the cover 32 and the side surface 30*d* are in contact with each other or are at a distance where the cover 32 and the side surface 30*d* may come into contact with each other. A gap D of 10 mm or less is formed between a side surface of the cover 32 at the armrest body 30 side and the pad 41 on the armrest body 30 side, and the outer layer 40 is interposed in this gap D.

Figure 6:
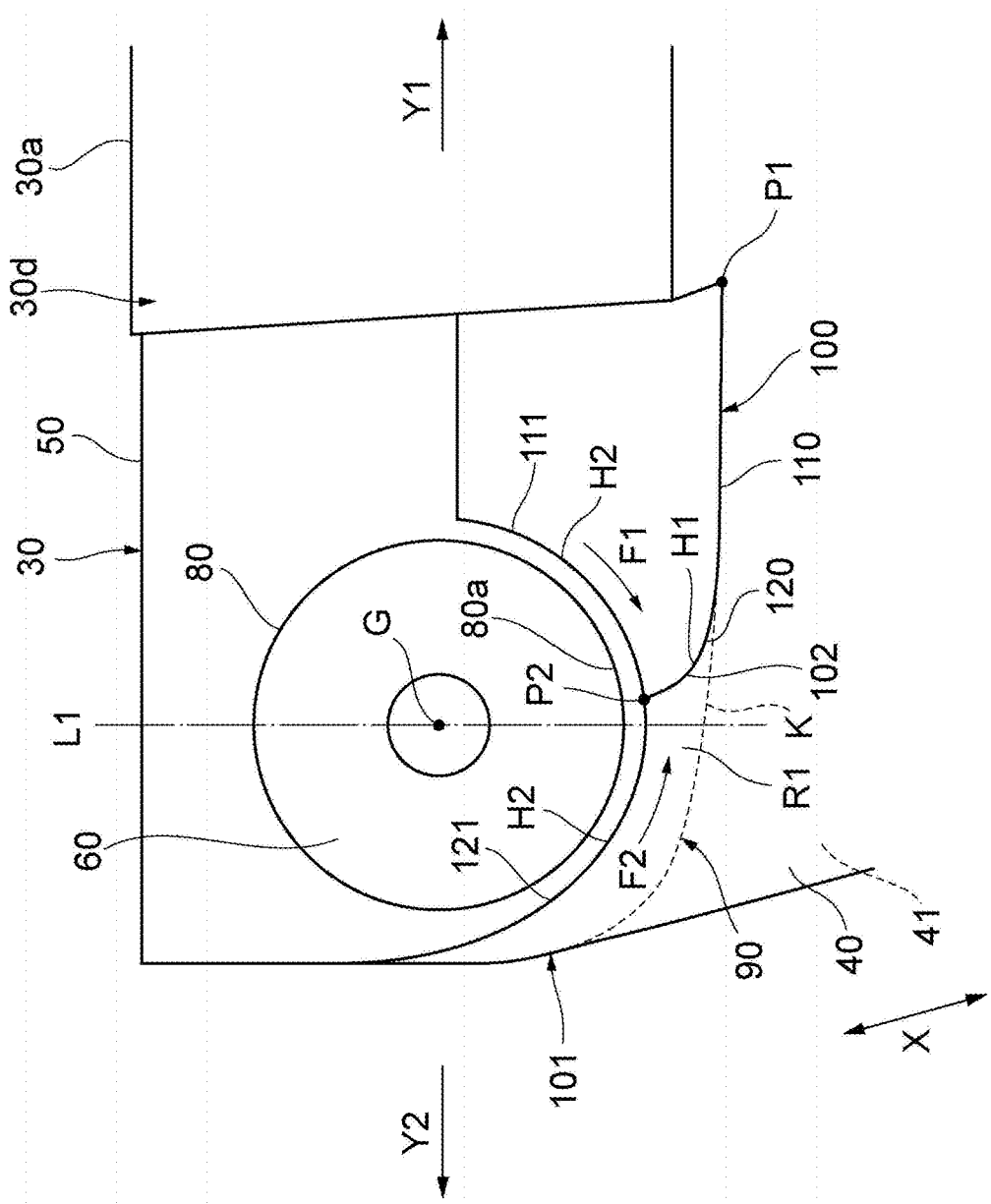
FIG. 6 is a schematic view for explaining a configuration of a side surface of the armrest body.

As shown in FIG. 6, a connecting portion 80 connected to the rotating mechanism 31 is provided in the recessed portion 50 on the side surface 30*d* of the armrest body 30. The connecting portion 80 is provided, for example, in a circular shape. The connecting portion 80 is, for example, an end portion of the shaft frame 60.

The outer layer 40 has an outer layer section 90 that covers a lower region R1 of the connecting portion 80 along a lower edge 80*a* of the connecting portion 80. The outer layer section 90 has a first outer layer portion 100 and a second outer layer portion 101 stitched to the first outer layer portion 100.

A stitching line 102 stitching together the first outer layer portion 100 and the second outer layer portion 101 is formed so as to extend from a starting point P1 thereof, bend upward toward the lower edge 80*a* of the connecting portion 80 while extending to a rear Y2 of the armrest body 30, and have an end point P2 thereof reach the lower edge 80*a* of the connecting portion 80. The starting point P1 is located on, for example, a ridge line (corner) K where the side surface 30*d* and the lower surface 30*b* are connected, in the vicinity of an end portion of a front Y1 of the recessed portion 50. The stitching line 102 travels backward on the ridge line K between the side surface 30*d* and the lower surface 30*b*, then separates from the ridge line K to bend upward in an arc shape, and then is exposed to the lower edge 80*a* of the connecting portion 80.

When viewed from a side, the end point P2 is disposed adjacent to a virtual vertical line L1 passing through a rotation center G of the connecting portion 80 in the first position. By "the end point P2 is disposed adjacent to a virtual vertical line L1", it means that the distance between the end point P2 and the virtual vertical line L1 is 15 mm or less; the end point P2 may be disposed on the front Y1 side or the rear Y2 side from the virtual vertical line L1 or may be disposed on the virtual vertical line L1.

For example, the first outer layer portion 100 has an approximately L-shape, and has a lower edge 110 along the stitching line 102 and an upper edge 111 along the lower edge 80*a* of the connecting portion 80.

As with the stitching line 102, the lower edge 110 is formed so as to curve upward while extending from the starting point P1 toward the rear Y2 of the armrest body 30 and have the end point P2 reach the lower edge 80*a* of the connecting portion 80.

The upper edge 111 has an arc shape depressed downward along a front half of the lower edge 80*a* of the connecting portion 80. The upper edge 111 is stitched to the pad 41 provided inside the armrest body 30.

The second outer layer portion 101 is formed so as to extend from, for example, the lower surface 30*b* of the armrest body 30 to the side surface 30*d*. In other words, the second outer layer portion 101 is integrated with the lower surface 30*b* covered by the outer layer 40.

The second outer layer portion 101 includes a first upper edge 120 along the stitching line 102 and a second upper edge 121 along the lower edge 80a of the connecting portion 80.

As with the stitching line 102, the first upper edge 120 is formed so as to curve upward while extending from the starting point P1 toward the rear Y2 of the armrest body 30 and have the end point P2 reach the lower edge 80a of the connecting portion 80.

The second upper edge 121 has an arc shape depressed downward along a rear half of the lower edge 80a of the connecting portion 80. The second upper edge 121 is stitched to the pad 41 provided inside the armrest body 30.

Figure 7:
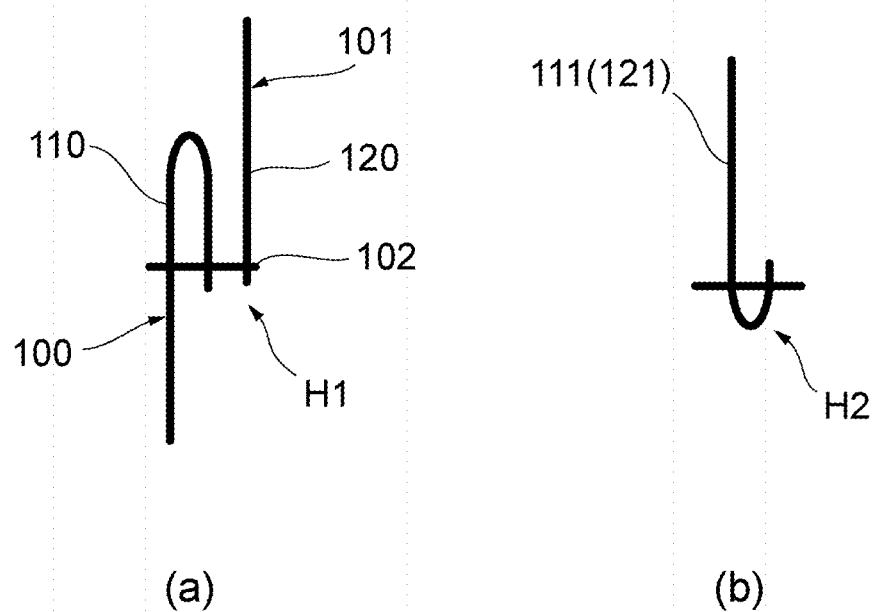
FIG. 7A is a schematic view for explaining a stitching portion connecting a first outer layer portion and a second outer layer portion.
FIG. 7B is a schematic view for explaining the stitching portion connecting the first outer layer portion, the second outer layer portion, and a pad.

A stitching portion (stitching portion of the stitching line 102) H1 between the lower edge 110 of the first outer layer portion 100 and the first upper edge 120 of the second outer layer portion 101 is formed by folding the fabric of, for example, the lower edge 110 and stitching the fabric to the fabric of the first upper edge 120, as shown in, for example, FIG. 7A, thereby obtaining three layers of the fabric for the outer layer portion, and in this state the outer layer portion is stitched to the underlying pad 41.

As shown in FIG. 7B, a stitching portion H2 of the upper edge 111 of the first outer layer portion 100 is formed by folding and stitching the fabric of the upper edge 111, thereby obtaining two layers of the fabric for the outer layer portion, and in this state the outer layer portion is stitched to the underlying pad 41. Similarly, the stitching portion H2 of the second upper edge 121 of the second outer layer portion 101 is formed by folding and stitching the fabric of the second upper edge 121, thereby obtaining two layers of the fabric for the outer layer portion, and in this state the outer layer portion is stitched to the underlying pad 41. Therefore, the stitching portion H2 is thinner than the stitching portion H1.

In the armrest 11 configured as described above, when the armrest body 30 rotates from, for example, the first position (horizontal position) to the second position (upright position), the first outer layer portion 100 is subjected to a frictional force F1 (shown in FIG. 6) by the cover 32 in the direction opposite to the direction of rotation. The frictional force F1 is received by the stitching line 102 extending in a direction substantially perpendicular to the frictional force F1. As a result, the first outer layer portion 100 is prevented from shifting in the direction of the frictional force F1. Furthermore, when the armrest body 30 rotates from, for example, the second position to the first position, the second outer layer portion 101 is subjected to a frictional force F2 by the cover 32 in the direction opposite to the direction of rotation. The frictional force F2 is received by the stitching line 102 and released in the direction in which the stitching line 102 extends. As a result, the second outer layer portion 101 is prevented from shifting in the direction of the frictional force F2.

According to the present embodiment, the stitching line 102 stitching together the first outer layer portion 100 and the second outer layer portion 101 is formed in the outer layer section 90 of the lower region R1 of the connecting portion 80, wherein the stitching line 102 is formed so as to bend upward while extending from the starting point P1 thereof toward the rear Y2 and reach the lower edge 80a of the connecting portion 80. Thus, even when the stitching line 102 is subjected to friction from the cover 32 of the rotating mechanism 31 when the armrest body 30 rotates, the rolling up of the outer layer section 90 can be prevented. As a result, the metal part inside the armrest body 30 is prevented from being exposed, improving the appearance of the armrest. In addition, not exposing the metal part inside the armrest body 30 improves the safety.

The second outer layer portion 101 is formed so as to cover the lower surface 30b of the armrest body 30 and extend from the lower surface 30b to the side surface 30d where the lower region R1 of the connecting portion 80 is located. For this reason, the stitching portion for connecting the lower surface 30b and the side surface 30d of the armrest body 30 is not necessary, resulting in reducing the thickness of the outer layer section 90 and the friction between the outer layer section 90 and the cover 32.

Of an upper edge of the outer layer section 90 corresponding to the lower edge 80a of the connecting portion 80, a part on the front Y1 side from the end point P2 of the stitching line 102 is composed of the upper edge 111 of the first outer layer portion 100, and a part on the rear Y2 side from the end point P2 of the stitching line 102 is composed of the second upper edge 121 of the second outer layer portion 101. According to such configuration, the first outer layer portion 100 and the second outer layer portion 101 can appropriately cover the periphery of the connecting portion 80. Moreover, since the upper edge 111 of the first outer layer portion 100 and the second upper edge 121 of the second outer layer portion 101 do not have to be stitched together, and the fabric for the stitching portion H2 stitched to the pad 41 only needs to form two layers, the stitching portion H2 can be made thin. As a result, the friction between the outer layer section 90 and the cover 32 in the vicinity of the lower edge 80a of the connecting portion 80 can be reduced.

As viewed from the side, the end point P2 of the stitching line 102 is disposed adjacent to the virtual vertical line L1 passing through the rotation center G of the connecting portion 80 in the first position. For this reason, the frictional force that the outer layer section 90 receives from the cover 32 side when the armrest body 30 rotates, can effectively be dispersed to the first outer layer portion 100 and the second outer layer portion 101. As a result, the rolling up of the outer layer 40 can effectively be prevented.

In the present embodiment, the armrest 11 includes the rotating mechanism 31 and the cover 32 covering the rotating mechanism 31, wherein the cover 32 is disposed adjacent to the outer layer section 90. Therefore, the rolling up of the outer layer section 90 caused by the friction between the outer layer section 90 and the cover 32 can be prevented.

The rotating mechanism 31 has the lock mechanism 71 that locks the rotation of the armrest body 30 at a predetermined position. In this case, although the rotating mechanism 31 and the cover 32 thereof become large, the rolling up of the outer layer section 90 can be prevented.

Although a preferred embodiment of the present invention has been described above with reference to the accompanying drawings, the present invention is not limited thereto. It is clear that a person skilled in the art can come up with various modifications or corrections within the scope of the ideas described in the claims, and it is understood that such modifications and corrections belong to the technical scope of the present invention.

In the foregoing embodiment, for example, the first outer layer portion 100, the second outer layer portion 101, and the stitching line 102 are applied to the outer layer section 90 covering the lower region R1 of the connecting portion 80. However, the outer layer may cover the upper region of the connecting portion 80, and the first outer layer portion 100, the second outer layer portion 101, and the stitching line 102 may be applied to an outer layer section of the outer layer that covers and the upper region of the connecting portion 80. The first outer layer portion 100, the second outer layer portion 101, and the stitching line 102 may also be applied to both the outer layer section 90 covering the lower region R1 of the connecting portion 80 and the outer layer section covering the upper region of the connecting portion 80.

The shapes of the first outer layer portion 100 and the second outer layer portion 101 are not limited to those of the foregoing embodiment. In addition, in the foregoing embodiment, although the rotating mechanism 31 is provided on the side surface 30d of the armrest body 30 at the side opposite to the seat body 10, the present invention can also be applied to a configuration in which the rotating mechanism 31 is provided on the side surface 30c of the armrest body 30 at the seat body 10 side. The configuration of the rotating mechanism 31 is not limited to the one described in the foregoing embodiment; other configurations are possible as long as these configurations correspond to the mechanisms involved in the rotation of the armrest body 30. Also, the shape and structure of the armrest body 30 are not limited to those described in the foregoing embodiment. For example, in the foregoing embodiment, the armrest body 30 is wide in the seat width direction X and can be used as a backrest when in the upright position. However, the armrest body 30 may be narrow in the seat width direction X and may only be used to support the arm of the occupant. The element disposed adjacent to the side surface 30d of the armrest body 30 does not have to be the cover 32 and may be another member.

Moreover, the configurations of the armrest 11, the seat body 10 and the like are not limited to the ones described in the foregoing embodiment; other configurations may be applied.

The present invention is useful in providing an armrest that prevents the outer layer of the side surface of the armrest body from being rolled up by the cover of the rotating mechanism and the like.

What is claimed is:

1. An armrest of a vehicle seat, comprising:
   an armrest body that has at least an upper surface, a lower surface, and a side surface connected to the upper surface and the lower surface and facing in a seat width direction, and is capable of rotating with respect to a seat body about an axis extending in the seat width direction, wherein
   the armrest body includes
   on the side surface, a connecting portion connected to a rotating mechanism for rotating the armrest body, and
   an outer layer covering at least a peripheral region of at least either a lower region or an upper region of the connecting portion along an edge of the connecting portion,
   a section of the outer layer that covers the peripheral region of the connecting portion includes a first outer layer portion and a second outer layer portion connected by stitching to the first outer layer portion, and
   a stitching line stitching together the first outer layer portion and the second outer layer portion is formed so as to extend to a rear of the armrest body and bend toward the edge of the connecting portion, and an end point of the stitching line reaches the edge of the connecting portion.

2. The armrest according to claim 1, wherein the second outer layer portion is formed so as to cover the upper surface or the lower surface of the armrest body that is adjacent to the peripheral region of the connecting portion, and extend from the upper surface or the lower surface to a side surface where the peripheral region of the connecting portion is located.

3. The armrest according to claim 1, wherein an edge of the outer layer that corresponds to the edge of the connecting portion is configured such that a part of a stitching portion on a front side of the end point is formed of an edge of the first outer layer portion and a part of the stitching portion on a rear side of the end point is formed of an edge of the second outer layer portion.

4. The armrest according to claim 1, wherein the armrest body is at least rotatable to assume a first position where the upper surface is horizontal and a second position where the upper surface is upright, and in a side view, the end point of the stitching portion is disposed adjacent to a virtual vertical line passing through a rotation center of the connecting portion when the armrest body is in the first position.

5. The armrest according to claim 1, further comprising:
   the rotating mechanism; and
   a cover that covers the rotating mechanism, wherein
   the cover is disposed adjacent to the outer layer covering the peripheral region of the connecting portion of the armrest body.

6. The armrest according to claim 5, wherein the rotating mechanism is provided on a side surface of the armrest body that is on an opposite side to the seat body.

7. The armrest according to claim 1, wherein the rotating mechanism has a lock mechanism that locks rotation of the armrest body at a predetermined position.

* * * * *